United States Patent
Chun et al.

(10) Patent No.: US 8,149,768 B2
(45) Date of Patent: Apr. 3, 2012

(54) METHOD OF TRANSMITTING DATA IN MOBILE COMMUNICATION SYSTEM

(75) Inventors: Sung Duck Chun, Anyang-si (KR); Young Dae Lee, Anyang-si (KR); Sung Jun Park, Anyang-si (KR); Seung June Yi, Anyang-si (KR)

(73) Assignee: LG Electronics Inc., Seoul (KR)

( * ) Notice: Subject to any disclaimer, the term of this patent is extended or adjusted under 35 U.S.C. 154(b) by 79 days.

(21) Appl. No.: 12/452,183

(22) PCT Filed: Jun. 20, 2008

(86) PCT No.: PCT/KR2008/003550
§ 371 (c)(1),
(2), (4) Date: Mar. 19, 2010

(87) PCT Pub. No.: WO2008/156346
PCT Pub. Date: Dec. 24, 2008

(65) Prior Publication Data
US 2010/0165919 A1 Jul. 1, 2010

Related U.S. Application Data

(60) Provisional application No. 60/945,340, filed on Jun. 20, 2007, provisional application No. 60/955,040, filed on Aug. 10, 2007, provisional application No. 60/973,442, filed on Sep. 18, 2007, provisional application No. 60/976,766, filed on Oct. 1, 2007.

(30) Foreign Application Priority Data

Jun. 20, 2008 (KR) .................. 10-2008-0058653

(51) Int. Cl.
*H04W 4/00* (2009.01)

(52) U.S. Cl. ........................................ 370/328; 370/329
(58) Field of Classification Search .................. 370/328, 370/329
See application file for complete search history.

(56) References Cited

U.S. PATENT DOCUMENTS 5,878,041 A   3/1999  Yamanaka et al.
6,445,917 B1  9/2002  Bark et al.
(Continued)

FOREIGN PATENT DOCUMENTS

CN   1613210   5/2005
(Continued)

OTHER PUBLICATIONS

Ghosh et al., "Random Access Design for UMTS Air-Interface Evolution", Vehicular Technology Conference, Apr. 2007, pp. 1041-1045.
(Continued)

*Primary Examiner* — Gary Mui
*Assistant Examiner* — Richard K Chang
(74) *Attorney, Agent, or Firm* — McKenna Long & Aldridge LLP (57) ABSTRACT

A data transmission method for a mobile communication system is disclosed. A data transmission method at a specific protocol layer of a reception end of a mobile communication system includes receiving at least one data block of a specific protocol layer from a transmission end, and transmitting reception status indication information to the transmission end according to a reception status of the data block of the specific protocol layer. As a result, data can be more quickly and effectively transmitted to a destination.

6 Claims, 6 Drawing Sheets

U.S. PATENT DOCUMENTS

| | | |
|---|---|---|
| 6,594,240 B1 | 7/2003 | Chuah et al. |
| 6,728,918 B1 | 4/2004 | Ikeda et al. |
| 6,738,624 B1 | 5/2004 | Aksentijevic et al. |
| 6,862,450 B2 | 3/2005 | Mikola et al. |
| 6,874,113 B2 | 3/2005 | Chao et al. |
| 6,967,936 B1 | 11/2005 | Laroia et al. |
| 7,171,163 B2 | 1/2007 | Terry et al. |
| 7,180,885 B2 | 2/2007 | Terry |
| 7,227,857 B2 | 6/2007 | Kuo |
| 7,227,868 B2 | 6/2007 | Inden |
| 7,295,573 B2 | 11/2007 | Yi et al. |
| 7,313,116 B2 | 12/2007 | Lee et al. |
| 7,706,410 B2 | 4/2010 | Chun et al. |
| 7,710,930 B2 | 5/2010 | Kwak |
| 7,817,595 B2 | 10/2010 | Wu |
| 7,894,444 B2 | 2/2011 | Lohr et al. |
| 7,978,616 B2 | 7/2011 | Chun et al. |
| 8,027,363 B2 | 9/2011 | Chun et al. |
| 8,059,597 B2 | 11/2011 | Park et al. |
| 8,081,662 B2 | 12/2011 | Chun et al. |
| 2002/0001314 A1 | 1/2002 | Yi et al. |
| 2002/0009999 A1 | 1/2002 | Lee et al. |
| 2002/0024972 A1 | 2/2002 | Yi et al. |
| 2002/0122411 A1 | 9/2002 | Zimmerman et al. |
| 2003/0007490 A1 | 1/2003 | Yi et al. |
| 2003/0099305 A1 | 5/2003 | Yi et al. |
| 2003/0194992 A1 | 10/2003 | Kim et al. |
| 2004/0022213 A1 | 2/2004 | Choi et al. |
| 2004/0076182 A1 | 4/2004 | Wu |
| 2004/0103435 A1 | 5/2004 | Yi et al. |
| 2004/0146019 A1 | 7/2004 | Kim et al. |
| 2004/0147236 A1 | 7/2004 | Parkvall et al. |
| 2004/0148396 A1 | 7/2004 | Meyer et al. |
| 2004/0153852 A1 | 8/2004 | Wu |
| 2004/0156330 A1 | 8/2004 | Yi et al. |
| 2004/0184438 A1 | 9/2004 | Terry |
| 2005/0020260 A1 | 1/2005 | Jeong et al. |
| 2005/0039101 A1* | 2/2005 | Torsner .................. 714/748 |
| 2005/0042987 A1 | 2/2005 | Lee et al. |
| 2005/0047416 A1 | 3/2005 | Heo et al. |
| 2005/0054365 A1 | 3/2005 | Ahn et al. |
| 2005/0063347 A1 | 3/2005 | Sarkkinen et al. |
| 2005/0083943 A1 | 4/2005 | Lee et al. |
| 2005/0094596 A1 | 5/2005 | Pietraski et al. |
| 2005/0096017 A1 | 5/2005 | Kim et al. |
| 2005/0118992 A1 | 6/2005 | Jeong et al. |
| 2005/0147040 A1 | 7/2005 | Vayanos et al. |
| 2005/0164683 A1 | 7/2005 | Roberts et al. |
| 2005/0193309 A1 | 9/2005 | Grilli et al. |
| 2005/0201354 A1 | 9/2005 | Hosaka et al. |
| 2005/0237932 A1 | 10/2005 | Liu |
| 2005/0238051 A1 | 10/2005 | Yi et al. |
| 2005/0250526 A1 | 11/2005 | Lindoff et al. |
| 2005/0254467 A1 | 11/2005 | Li et al. |
| 2005/0259662 A1 | 11/2005 | Kim et al. |
| 2005/0287957 A1 | 12/2005 | Lee et al. |
| 2006/0056441 A1 | 3/2006 | Jiang |
| 2006/0067238 A1 | 3/2006 | Olsson |
| 2006/0067289 A1 | 3/2006 | Lee et al. |
| 2006/0072494 A1 | 4/2006 | Matusz et al. |
| 2006/0072503 A1 | 4/2006 | Kim et al. |
| 2006/0084389 A1 | 4/2006 | Beale et al. |
| 2006/0092972 A1 | 5/2006 | Petrovic et al. |
| 2006/0128312 A1 | 6/2006 | Declerck et al. |
| 2006/0142020 A1 | 6/2006 | Mueckenheim et al. |
| 2006/0154603 A1 | 7/2006 | Sachs et al. |
| 2006/0154680 A1 | 7/2006 | Kroth et al. |
| 2006/0165045 A1 | 7/2006 | Kim et al. |
| 2006/0203780 A1 | 9/2006 | Terry |
| 2006/0233200 A1 | 10/2006 | Fifield et al. |
| 2006/0251027 A1 | 11/2006 | Chun et al. |
| 2006/0251105 A1 | 11/2006 | Kim et al. |
| 2006/0264179 A1 | 11/2006 | Bonneville et al. |
| 2006/0268798 A1 | 11/2006 | Kim et al. |
| 2006/0280145 A1 | 12/2006 | Revel et al. |
| 2007/0047493 A1 | 3/2007 | Park et al. |
| 2007/0053309 A1 | 3/2007 | Poojary et al. |
| 2007/0060139 A1 | 3/2007 | Kim et al. |
| 2007/0079207 A1 | 4/2007 | Seidel et al. |
| 2007/0081468 A1 | 4/2007 | Timus et al. |
| 2007/0081513 A1 | 4/2007 | Torsner |
| 2007/0091810 A1 | 4/2007 | Kim et al. |
| 2007/0097913 A1 | 5/2007 | Hanov |
| 2007/0189205 A1 | 8/2007 | Terry et al. |
| 2007/0201397 A1 | 8/2007 | Zhang |
| 2007/0268861 A1 | 11/2007 | Diachina et al. |
| 2007/0274278 A1 | 11/2007 | Choi et al. |
| 2008/0008152 A1 | 1/2008 | Lohr et al. |
| 2008/0051098 A1 | 2/2008 | Rao |
| 2008/0069108 A1 | 3/2008 | Yi et al. |
| 2008/0084851 A1 | 4/2008 | Kim et al. |
| 2008/0146242 A1 | 6/2008 | Alanara et al. |
| 2008/0182609 A1 | 7/2008 | Somasundaram et al. |
| 2008/0186936 A1 | 8/2008 | Chun et al. |
| 2008/0186944 A1 | 8/2008 | Suzuki et al. |
| 2008/0198869 A1 | 8/2008 | Jiang |
| 2008/0268878 A1 | 10/2008 | Wang et al. |
| 2008/0310395 A1 | 12/2008 | Kashima |
| 2008/0318578 A1 | 12/2008 | Worrall |
| 2009/0016301 A1 | 1/2009 | Sammour et al. |
| 2009/0046695 A1 | 2/2009 | Jiang |
| 2009/0104890 A1 | 4/2009 | Wang et al. |
| 2009/0175163 A1 | 7/2009 | Sammour et al. |
| 2009/0175253 A1 | 7/2009 | Wu et al. |
| 2009/0259908 A1 | 10/2009 | Gollapudi |
| 2010/0014466 A1 | 1/2010 | Meyer et al. |
| 2010/0142457 A1 | 6/2010 | Chun et al. |
| 2011/0033048 A1 | 2/2011 | Stanwood et al. |

FOREIGN PATENT DOCUMENTS

| | | |
|---|---|---|
| EP | 1326397 | 7/2003 |
| EP | 1 343 267 | 9/2003 |
| EP | 1 508 992 | 2/2005 |
| EP | 1 689 130 | 8/2006 |
| EP | 1 695 462 A1 | 8/2006 |
| EP | 1 746 855 | 1/2007 |
| EP | 1 768 297 | 3/2007 |
| EP | 1 796 405 | 6/2007 |
| JP | 07-162948 | 6/1995 |
| JP | 2001-197021 | 7/2001 |
| JP | 2002-198895 A | 7/2002 |
| JP | 2003-516021 | 5/2003 |
| JP | 2003-229925 | 8/2003 |
| JP | 2007-116639 | 5/2007 |
| JP | 2007-312244 A | 11/2007 |
| JP | 2009-521893 | 6/2009 |
| KR | 10-2001-0045783 | 6/2001 |
| KR | 10-2001-0062306 | 7/2001 |
| KR | 10-2002-0004645 | 1/2002 |
| KR | 10-2003-0012048 | 2/2002 |
| KR | 10-2002-0097304 | 12/2002 |
| KR | 10-2003-0060055 | 7/2003 |
| KR | 10-2003-0068743 | 8/2003 |
| KR | 10-2003-0087914 A | 11/2003 |
| KR | 10-2004-0034398 | 4/2004 |
| KR | 10-2004-0039944 | 5/2004 |
| KR | 10-2004-0072961 | 8/2004 |
| KR | 10-2005-0022988 | 3/2005 |
| KR | 10-2005-0062359 | 6/2005 |
| KR | 10-2005-0081836 | 8/2005 |
| KR | 10-2005-0092874 | 9/2005 |
| KR | 10-2005-0099472 | 10/2005 |
| KR | 10-2005-0100882 | 10/2005 |
| KR | 10-2005-0103127 A | 10/2005 |
| KR | 10-2006-0004935 | 1/2006 |
| KR | 10-2006-0014910 | 2/2006 |
| KR | 10-2006-0029452 A | 4/2006 |
| KR | 10-2006-0042858 | 5/2006 |
| KR | 10-2006-0069378 | 6/2006 |
| KR | 10-2006-0079784 | 7/2006 |
| KR | 10-2006-0090191 | 8/2006 |
| KR | 10-2006-0134058 | 12/2006 |
| KR | 10-2007-0048552 | 5/2007 |
| KR | 10-2007-0076374 A | 7/2007 |
| RU | 2291594 C2 | 1/2007 |
| RU | 2304348 | 8/2007 |
| WO | WO 01/37473 | 5/2001 |

| | | |
|---|---|---|
| WO | WO 01/39386 A1 | 5/2001 |
| WO | WO 03/045103 | 5/2003 |
| WO | WO 2004/042953 A1 | 5/2004 |
| WO | WO 2004/042963 | 5/2004 |
| WO | WO 2005/039108 | 4/2005 |
| WO | WO 2005/122441 A1 | 12/2005 |
| WO | WO 2005/125226 | 12/2005 |
| WO | WO 2006/009714 | 1/2006 |
| WO | WO 2006/046894 | 5/2006 |
| WO | WO 2006/052086 | 5/2006 |
| WO | WO 2006/083149 | 8/2006 |
| WO | WO 2006/118418 | 11/2006 |
| WO | WO 2007/020070 | 2/2007 |
| WO | WO 2007/024065 | 3/2007 |
| WO | WO 2007/039023 | 4/2007 |
| WO | WO 2007/045505 | 4/2007 |
| WO | WO 2007/052900 | 5/2007 |
| WO | WO 2007/066900 | 6/2007 |
| WO | WO 2007/078142 | 7/2007 |
| WO | WO 2007/078155 A2 | 7/2007 |
| WO | WO 2007/078164 | 7/2007 |
| WO | WO 2007/078173 | 7/2007 |
| WO | WO 2007/078174 A1 | 7/2007 |
| WO | WO 2007/079085 | 7/2007 |
| WO | WO 2007/089797 | 8/2007 |
| WO | WO 2007/091831 A2 | 8/2007 |
| WO | WO 2007/126793 | 11/2007 |
| WO | WO 2007-078174 A1 | 12/2007 |
| WO | WO 2007/147431 | 12/2007 |
| WO | WO 2008/004725 A1 | 1/2008 |
| WO | WO 2008/010063 | 1/2008 |

OTHER PUBLICATIONS

Abeta et al., "Super 3G Technology Trends. Part 2: Research on Super 3G Technology", NTT Docomo Technical Journal, vol. 8, No. 3, Dec. 2006, pp. 55-62.
Nokia, "System Information Distrubution", 3GPP TSG-RAN WG2 Ad Hoc Meeting on LTE, R2-061487, Jun. 2006.
LG Electronics, "Delivery of LTE System Information", 3GPP TSG-RAN WG2 Ad Hoc Meeting on LTE, R2-061959, Jun. 2006.
NEC, "Optimised buffer status reporting", 3GPP TSG-RAN WG2 #58bis, R2-072515, Jun. 2007.
Catt, Ritt, "Consideration on UL Buffer Reporting", 3GPP TSG-RAN WG2 #55, R2-062935, Oct. 2006.
Nokia: "Buffer reporting for E-UTRAN", R2-060829, 3GPP TSG-RAN WG2 Meeting #52, Mar. 27-31, 2006, Athens, Greece. XP-002503218.
Nokia: "Uplink Scheduling for VoIP", R2-070476, 3GPP TSG-RAN WG2 Meeting #57, Feb. 12-16, 2007. St. Louis, Missouri. XP-008125208.
R2-074691; Ericsson, Nokia Corporation, Nokia Siemens Networks, Qualcomm Europe, Samsung, NTT DoCoMo, Inc. "Framework for Scheduling Request and Buffer Status reporting", Nov. 5-9, 2007, TSG-RAN WG2 Meeting #60.
R1-063046; Motolola, "Syncronized Random Access Channel and Scheduling Request", Nov. 6-10, 2006, 3GPP TSG RAN1 #47.
R2-062350; Ericsson, "Basic Principles for the Scheduling Request in LTE", Aug. 28-Sep. 1, 2006, 3GPP TSG RAN WG2 #54.
R1-063301; NTT DoCoMo, Fujitsu, Mitsubishi Electric, NEC, Sharp, Toshiba Corporation, "Scheduling Request Transmission Method for E-UTRA Uplink", Nov. 6-10, 2006, 3GPP TSG RAN WG1 Meeting #47.
LG Electronics Inc. "Correction of status report coding", 3GPP TSG RAN WG2 #61, Feb. 11-15, 2008, Sorrento, Italy, XP-002624626.
3$^{rd}$ Generation Partnership Project: "Technical Specification Group Radio Access Network, Evolved Universal terrestrial Radio Access (E-UTRA), Packet Data Convergence Protocol (PDCP) specification (Release 8)", 3GPP TS 36.323 V8.2.1, May 2008.
Alcatel-Lucent: "PDCP status report carrying LIS only", 3GPP TSG RAN WG2 #61, Jan. 14-18, 2008, Sevilla, Spain, XP-50138711.
Qualcomm Europe: "Further Details on RACH Procedure", 3GPP TSG-RAN WG1 #48, Feb. 12-16, 2007, St. Louis, Missouri, R1-070649.
NTT DoCoMo, Inc. "Buffer Status Report and Scheduling Request triggers", 3GPP TSG RAN WG2 #59, Aug. 20-24, 2007, Athens, Greece, R2-072574.
"correction to PDCP Status Report", 3GPP TSG RAN WG2 #61bis, Mar. 24, 2008, R2-081594, XP-002624627.
Wang et al., U.S. Appl. No. 60/976,139, filed Sep. 28, 2007, Operation of Control Protocol Data Units in Packet Data Convergence Protocol.
Sammour et al., U.S. Appl. No. 61/019,058, filed Jan. 4, 2008, Method and Apparatus of Performing Packet Data Convergence Protocol Reset.
ZTE: "Redundant retransmission restraint in RLC-AM" 3GPP Draft R2-061234, May 3, 2006, XP050131180.
"Digital Cellular telecommunications system (Phase 2+); Functional stage 2 description of Location Services (LSC) in GERAN (3GPP TS 43.059 version 7.3.0 Release 7); ETSI TS 143 059", May 1, 2007, XP014038519.
LG Electronics Inc: "UE State Transition in LTE_Active", 3 GPP TSG-RAN WG2 #52; Athens, Greece; Mar. 2006.
Texas Instruments: "UL Synchronization Management and Maintenance in E-UTRA"; Kobe, Japan; May 2007.
Texas Instruments: "UL Synchronization Management in LTE_Active"; St. Julians, Malta; Mar. 2007.
Motorola: "Contention-Free Intra-LTE Handover"; St. Louis, USA; Feb. 2007.
Ericsson: "Scheduling Request in E-UTRAN"; Sorrento, Italy; Jan. 2007.
Reuven Cohen: "An Improved SSCOP-like Scheme for Avoiding Unnecessary Retransmissions and Achieving Ideal Throughput", Conference on Computer Communications, Fifteenth Annual Joint conference of the IEEE computer and communications societies, Mar. 24-28, 1996, vol. 2, pp. 855-862, XP010158150.
3GPP TS 36.322, V8.0.0, Dec. 2007, 3$^{rd}$ Generation Partnership Project; Technical Specification Group Radio Access Network; Evolved Universal Terrestrial Radio Access (E-UTRA) Radio Link Control (RLC) protocol specification (Release 8).
Change Request, Miscellaneous corrections to TS 36.322, 3GPP TSG-RAN2 Meeting #61, Shenzhen, China, Mar. 31-Apr. 4, 2008, R2-081700.
Ericsson: "Clarification to the handling of large RLC status reports", Change Request, 3GPP TSG-RAN2 Meeting #61bis, Shenzhen, China, Mar. 31-Apr. 4, 2008, R2-082018.
LG Electronics et al. "ACK_SN setting for short STATUS PDU", 3GPP TSG-RAN WG2 #62, May 5-9, 2008, Kansas City, Missouri, R2-082133.
Qualcomm Europe: "Scheduling request mechanism", 3GPP TSG-RAN WG1 #48bis, St. Juilan, Malta, Mar. 26-30, 2007, R1-071276.
Texas Instruments: "Scheduling Request and DRX in E-UTRA", 3GPP TSG RAN WG1 #49bis, Orlando, Florida, Jun. 25-29, 2007, R1-072859.
Ericsson: "SDU Discard", 3GPP TSG-RAN WG2 #59, Athens, Greece, Aug. 20-24, 2007, R2-073230.
Nokia Siemens Networks: "Update on Security, System Information, Mobility, MBMS and DRX", 3GPP TSG-RAN2 Meeting #59, Athens, Greece, Jun. 20-24, 2007, R2-073863.

* cited by examiner

METHOD OF TRANSMITTING DATA IN MOBILE COMMUNICATION SYSTEM

This application claims priority to International Application No. PCT/KR2008/003550 filed on Jun. 20, 2008, which claims priority to U.S. Provisional Application No. 60/945,940 filed Jun. 20, 2007, U.S. Provisional Application No. 60/955,040 filed Aug. 10, 2007, U.S. Provisional Application No. 60/973,442 filed Sep. 18, 2007, U.S. Provisional Application No. 60/976,766 filed Oct. 1, 2007 and Korean Patent Application No. 10-2008-0058653, filed on Jun. 20, 2008, all of which are incorporated by reference for all purposes as if fully set forth herein.

TECHNICAL FIELD

The present invention relates to a data transmission method for a mobile communication system, and more particularly to a method for retransmitting data at a specific protocol layer of a mobile communication system.

BACKGROUND ART

Figure 1:
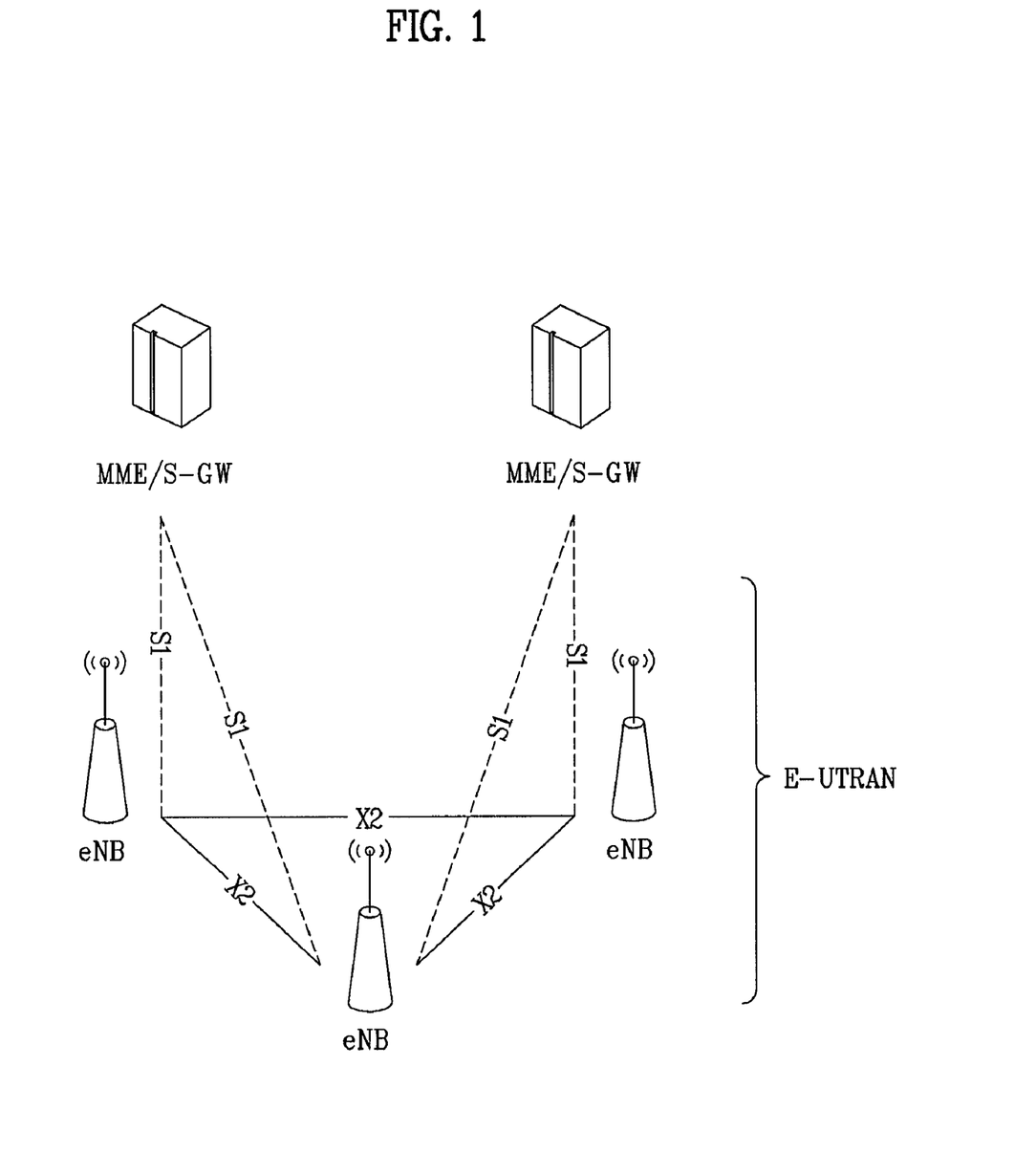
FIG. 1 is a structural diagram illustrating a network structure of an Evolved Universal Mobile Telecommunication System (E-UMTS) acting as a fourth-generation mobile communication system.

FIG. 1 is a structural diagram illustrating a network structure of an Evolved Universal Mobile Telecommunication System (E-UMTS) acting as a fourth-generation mobile communication system. The E-UMTS system is developed from a conventional UMTS system, and conducts intensive research into a basic standardization process in the current 3GPP. The E-UMTS system may also be called a Long Term Evolution (LTE) system.

The E-UMTS network is classified into an Evolved UTRAN (E-UTRAN) and an Evolved Packet Core (EPC). The E-UTRAN includes a user equipment (UE), an eNode-B, an Access Gateway (AG) which is located at the end of a network simultaneously while being connected to an external network, and a Mobility Management Entity (MME)/User Plane Entity (UPE). The AG may be divided into a first AG part for taking charge of user traffic and a second AG part for taking charge of control traffic.

In this case, a new interface may be located between the first AG part for processing the new user traffic and the second AG part for processing the control traffic, such that the first AG part may communicate with the second AG part. A single eNode-B may include at least one cell. An interface for transmitting either the user traffic or the control traffic may be located between the eNode-Bs. The EPC may include an AG or a node for user registration of other UEs, etc. An interface for distinguishing the E-UTRAN from the EPC may also be used. Several nodes are located between the eNode-B and the AG via the S1 interface. In this case, the several nodes are interconnected (i.e., Many to Many Connection). Several eNode-Bs are interconnected via the X2 interface, and a meshed network which always has the X2 interface is located between the eNode-Bs.

Radio protocol layers between the user equipment (UE) and the network are classified into a first layer (L1), a second layer (L2), and a third layer (L3) of an Open System Interconnection (OSI) reference model well known to a communication system. A physical layer contained in the L2 layer provides an information transfer service using a physical channel. A radio resource control (RRC) layer located in a third layer controls radio resources between the UE and the network. For this operation, the RRC message is exchanged between the UE and the network in the RRC layer. The RRC layer is located at the eNode-B in the E-UTRAN network.

Figure 2:
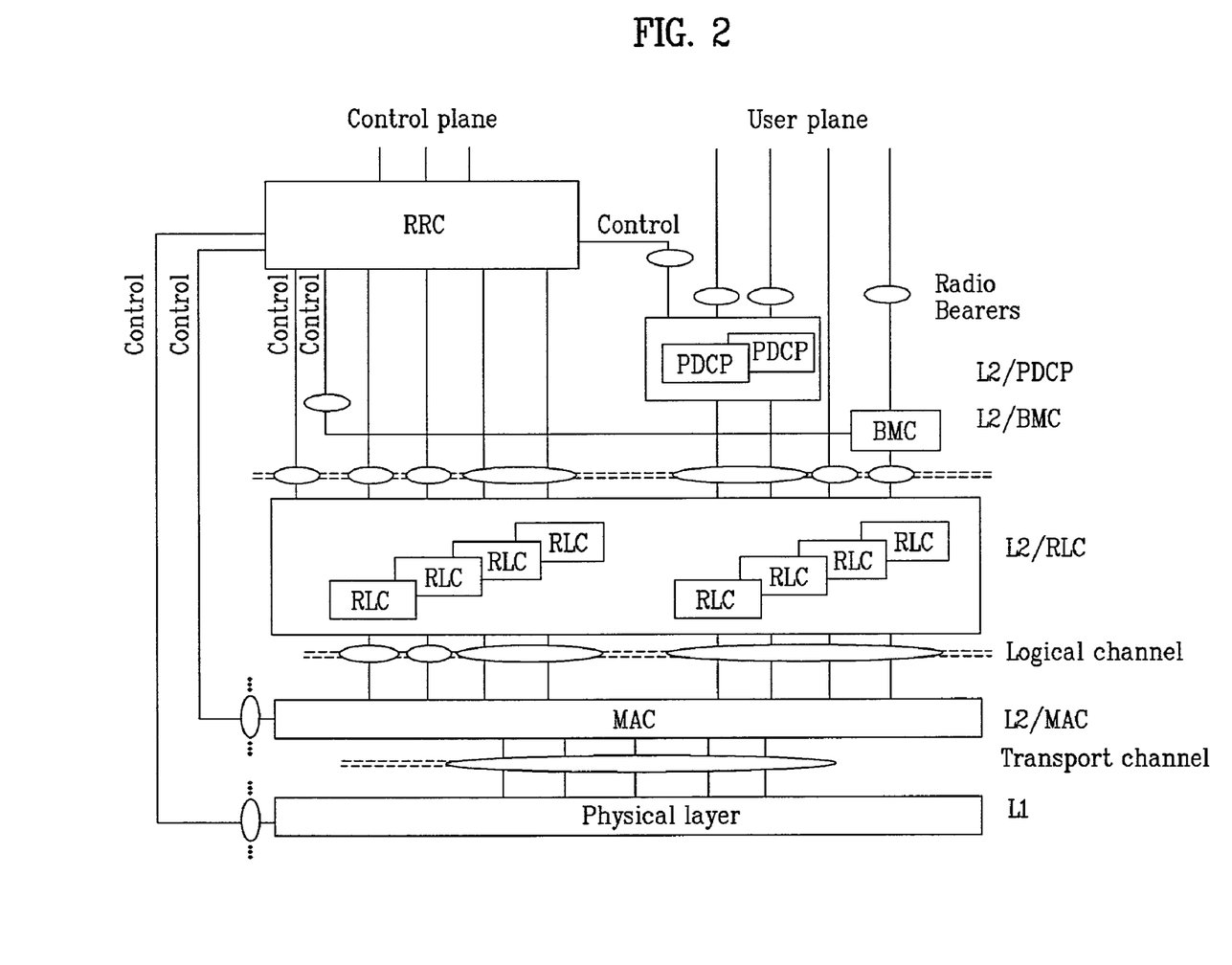
FIG. 2 is a structural diagram illustrating a radio protocol layer structure between the UE and the E-UTRAN (Evolved-UMTS Terrestrial Radio Access Network) on the basis of the 3GPP radio access network standard acting as the third-generation mobile communication standardization organization.

FIG. 2 is a structural diagram illustrating a radio protocol layer structure between the UE and the E-UTRAN (Evolved-UMTS Terrestrial Radio Access Network) on the basis of the 3GPP radio access network standard acting as the third-generation mobile communication standardization organization. The radio protocol layer structure of FIG. 2 horizontally includes a physical layer, a data link layer, and a network layer. The radio protocol layer structure of FIG. 2 vertically includes a user plane for transmitting data information and a control plane for transmitting a control signal (i.e., signaling information). The radio protocol layers of FIG. 2 are classified into a first layer (L1), a second layer (L2), and a third layer (L3) of an Open System Interconnection (OSI) reference model well known to a communication system.

The control plane and the user plane in the radio protocol layer structure of FIG. 2 will hereinafter be described. The first layer (L1) is a physical layer. The physical layer provides an upper layer with an information transfer service over a physical channel. The physical layer is connected to an upper medium access control (MAC) layer over a transport channel. Data is communicated between the MAC layer and the physical layer via the transport channel. Data is communicated between different physical layers over a physical channel. Namely, Data is communicated between a first physical layer of a transmission end and a second physical layer of a reception end.

The medium access control (MAC) layer of the second layer transmits services to a radio link control (RLC) layer acting as an upper layer over a logical channel. The RLC layer supports transmission of reliable data. A function of the RLC layer may be implemented with any function block contained in the MAC. In this case, it should be noted that there is no RLC layer. PDCP layer of the second layer (L2) performs a header compression function for reducing the IP packet header size including relatively large- and unnecessary-control information, such that it can effectively transmit IP packet (such as IPv4 or IPv6) within a small-bandwidth RF interval. The PDCP layer of the E-UTRAN is located at the AG.

A Radio Resource Control (RRC) layer located at the uppermost of the third layer is defined in only the control plane. The RRC layer is associated with configuration, re-configuration, and release of a radio bearer (RB), such that it controls a logical channel, a transport channel, and a physical channel. In this case, the radio bearer (RB) is indicative of a service provided from a second layer to implement data communication between the UE and the E-UTRAN.

The unit of data transmitted to each layer of the radio protocol layer structure is called different names. This data unit is called a service data unit (SDU). A basic unit for allowing a protocol to transmit data to another layer is called a protocol data unit (PDU). Data which moves between layers of a radio access protocol structure or between radio access protocol structures is indicative of a predetermined data block such as the above-mentioned SDU or PDU.

The RLC layer will hereinafter be described in detail. A basic function of the RLC layer guarantees a Quality of Service (QoS) of each RB and transmits data for the guaranteed QoS. The RB service allows the second layer (L2) of the radio protocol to be provided to an upper part, such that a total of the second layer (L2) affects a QoS of the RB. Specifically, it should be noted that the RB QoS is more affected by the RLC of the second layer (L2). The RLC has an independent RLC entity for each RB to guarantee a unique QoS of the RB, and provides three RLC modes to support a variety of quality of services (QoSs). The three RLC modes are a transparent mode (TM) RLC mode, an unacknowledged mode (UM) RLC mode, and an acknowledged mode (AM) RLC mode.

The above-mentioned RLC modes support different QoSs, have different operation methods, and have different detailed functions. Next, the above-mentioned RLC operation modes will hereinafter be described in detail.

When the PDU (hereinafter referred to as RLC PDU) is configured in the RLC layer, the TM RLC attaches no overhead to the SDU (hereinafter referred to as RLC SDU) of the RLC layer received from an upper layer. In other words, the RLC transparently passes through the SDU, such that this RLC is called a TM RLC. Due to this feature, the following operations are performed in the user plane and the control plane. The user plane has a short data processing time in the RLC, and the control plane has no overhead in the RLC, such that an uplink conducts transmission of the RRC message from an unspecified UE and a downlink conducts transmission of the RRC message broadcast to all UEs contained in a cell.

If overhead is added to the RLC differently from the transparent mode (TM) mode, this mode is called a non-transparent mode. The non-transparent mode has the UM RLC mode having an acknowledgment (ACK) signal of Tx data and the AM RLC mode having no ACK signal of the Tx data. The UM RLC attaches a PDU header including a sequence number to each PDU, and transmits the attached result, such that a reception end can recognize which one of PDUs has been lost during a transmission time. Due to this function, in the user plane, the UM RLC mainly transmits broadcast/multicast data or transmits real-time packet data (e.g., VoIP or streaming) of a packet service (PS) domain. In the control plane, the UM RLC transmits a specific RRC message, which does not require the ACK signal, from among several RRC messages transmitted to a specific UE or a specific UE group in a cell.

The AM RLC from among the non-transparent modes attaches the PDU header including a sequence number to the PDU in the same manner as in the UM RLC. Differently from the UM RLC, in the case of the AM RLC, the reception end transmits the acknowledgment (ACK) signal to the PDU received from the transmission end. The reason why the reception end transmits the acknowledgment (ACK) signal in the AM RLC is that the transmission end requests retransmission of the PDU which has not been received in the reception end. This retransmission function is the highest feature of the AM RLC. The AM RLC aims to guarantee transmission of error-free data for the above retransmission. Due to this purpose, in the user plane, the AM RLC mainly conducts transmission of non-realtime packet data such as TCP/IP of a PS domain. In the control plane, the AM RLC transmits a specific RRC message, which requires the ACK signal, from among several RRC messages transmitted to a specific UE in a cell.

From the viewpoint of directivity, the TM RLC or the UM RLC is used to implement unidirectional communication. The AM RLC receives a feedback message from a reception end, such that it is used to implement bidirectional communication. This bidirectional communication has been widely used to implement a point-to-point communication, such that the AM RLC uses only a dedicated logical channel. There is a difference in structure between the TM RLC and the UM RLC. In the case of the TM or UM RLC, a single RLC entity has a single Tx or Rx structure, but the AM RLC includes both the Tx structure and the Rx structure in a single RLC entity.

The AM RLC has a retransmission buffer other than a Tx/Rx buffer in order to implement retransmission management. Besides, the AM RLC performs a variety of techniques to control the signal flow. For example, a Tx/Rx window, a polling message, a status report message, a status PDU, and a piggyback may be used. The polling message allows the transmission end to request status information from the reception end of the RLC entity. The status report message allows the reception end to report its buffer status to the transmission end of the peer RLC entity. The status PDU is used to carry status information. The piggyback is used to increase the efficiency of data transmission, such that the status information PDU is inserted into the data PDU. In order to support the above-mentioned functions, the AM RLC requires a variety of protocol parameters, status variables, and a timer. PDU for reporting the above status information, the status information PDU, and PDUs for controlling transmission of data in the AM RLC are called control PDUs. PDUs for transmitting user data are called data PDUs.

Figure 3:
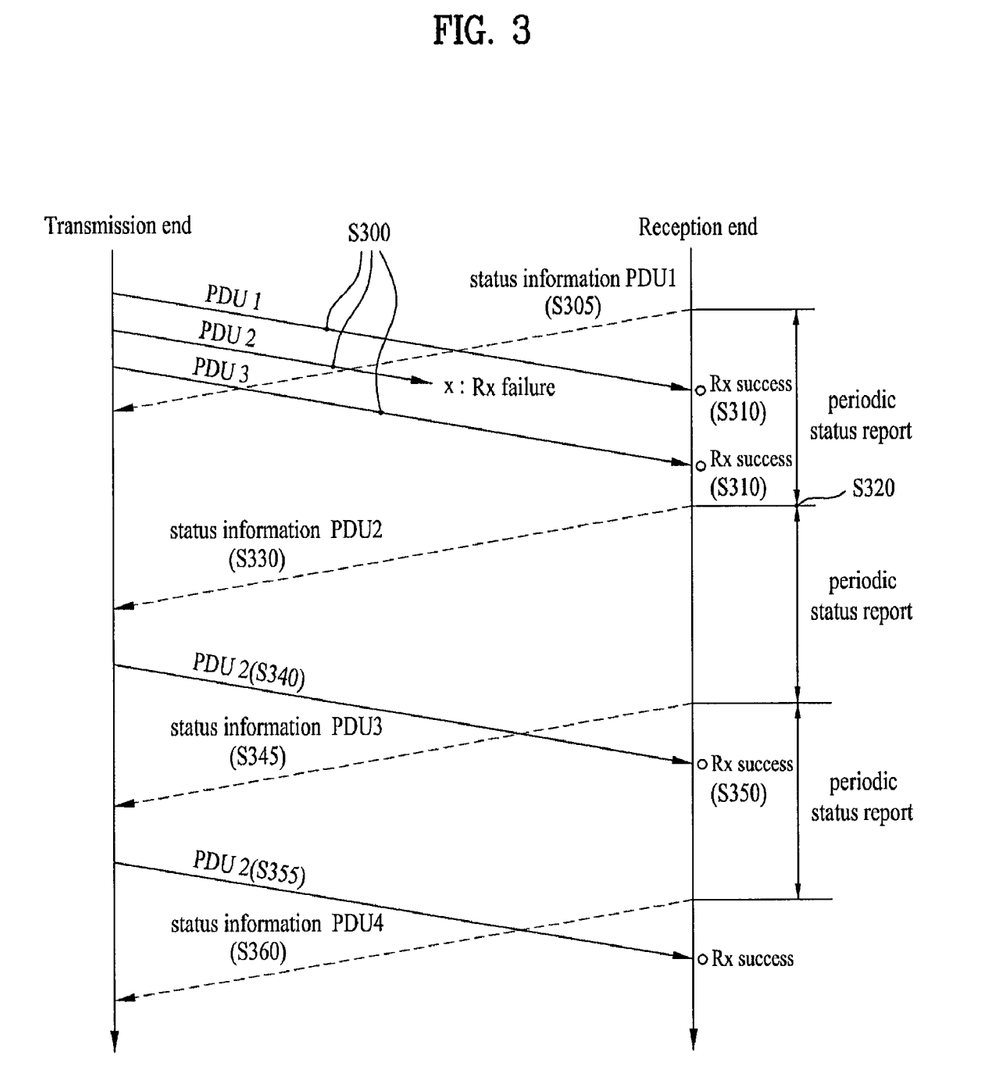
FIG. 3 is a flow chart illustrating an AM RLC PDU retransmission process of the AM RLC entity of a reception end according to the conventional art.

FIG. 3 is a flow chart illustrating an AM RLC PDU retransmission process of the AM RLC entity of a reception end according to the conventional art. Referring to FIG. 3, the AM RLC entity (hereinafter referred to as a transmission end) of the transmission end transmits PDU1, PDU2, and PDU3 of the AM RLC layer such that data is transmitted to the AM RLC entity (hereinafter referred to as a reception end) of the reception end at step S300. However, only PDU1 and PDU3 are received in the reception end at step S310.

The reception end is able to transmit a specific status report message indicating whether data has been received at intervals of a predetermined time to the transmission end. This transmission may be called a periodic status report transmission scheme. In other words, the reception end transmits the status PDU including the periodic status report to the transmission end at a specific time at which the timer driven at intervals of a predetermined period has expired. Then, the reception end resets the timer, and operates the timer. In FIG. 3, if a periodic status report timer of the reception end has expired at step S320, the reception end transmits status information 'PDU2' indicating non-received PDU2, and informs the transmission end of the status information at step S330. The transmission end retransmits 'PDU2' on the basis of the status information PDU2 received from the reception end at step S340. However, since the periodic status report timer has expired before the retransmitted PDU2 arrives at the reception end, the reception end transmits the status information PDU3 indicating non-received PDU2 at step S345. The transmission end which has received the status information PDU3 retransmits 'PDU2' at step S355.

Thereafter, the reception end receives the retransmitted PDU2 of the above step S340 without any error at step S350, and a Tx/Rx process of the AM RLC PDU is completed. However, if a new periodic status report time has expired at the reception end, the status information PDU4 is transmitted to the transmission end at step S360.

The above-mentioned status information PDU report at the reception end is conducted at intervals of a single fixed period without considering data retransmission status of the transmission end, and may encounter unnecessary consumption of radio resources without reflecting a data Tx situation between the transmission end and the reception end.

DISCLOSURE

Technical Problem

Accordingly, the present invention is directed to a data transmission method for a mobile communication system that substantially obviates one or more problems due to limitations and disadvantages of the related art.

An object of the present invention is to provide a data transmission method which has high Tx efficiency in a mobile communication system.

Another object of the present invention is to provide a data transmission method which has high retransmission efficiency in a specific protocol layer of a mobile communication system.

Another object of the present invention is to provide a method for retransmitting data in a specific protocol layer of a transmission/reception end of a mobile communication, and a method for reporting status information.

Technical Solution

To achieve these objects and other advantages and in accordance with the purpose of the invention, as embodied and broadly described herein, a data transmission method at a specific protocol layer of a reception end of a mobile communication system comprising: receiving at least one data block of a specific protocol layer from a transmission end; and transmitting reception status indication information, which is decided by at least one of an operation status of the specific protocol layer and a reception status indication information transmission scheme, to the transmission end.

In another aspect of the present invention, there is provided a data transmission method at a specific protocol layer of a reception end of a mobile communication system comprising: receiving at least one data block associated with a specific protocol layer from a transmission end; and transmitting reception status indication information to the transmission end according to a reception status of the data block of the specific protocol layer.

Preferably, the operation status of the specific protocol layer of the reception end is indicative of at last one of a status of a Rx buffer of the specific protocol layer and a status indicating the presence or absence of standby data to be received in the reception end.

Preferably, the status of the Rx buffer at the specific protocol layer of the reception end may indicate whether the Rx buffer has data not transmitted to the upper layer.

Preferably, the status of the Rx buffer at the specific protocol layer of the reception end may indicate the amount of data which is stored in the Rx buffer without reaching the upper layer.

Preferably, the status of the Rx buffer at the specific protocol layer of the reception end may indicate the ratio of the amount of data stored in the Rx buffer to the amount of total data capable of being stored in the Rx buffer.

Preferably, the reception status indication information may include at least one of buffer status information of the reception end, specific information indicating whether Tx data of the transmission end has been normally received in the reception end, and retransmission request information associated with data which has not been normally received in the reception end to the transmission-end.

Preferably, the data is a PDU used by a specific protocol layer, and may correspond to at least one of a data PDU and a control PDU.

Preferably, values of the environmental variables prescribed in the specific protocol layer are adjusted according to an operation status of the specific protocol layer of the reception end.

Preferably, each environmental variable for use in the adjusted protocol layer is indicative of a setup value which is established/adjusted to allow the entity of the specific protocol layer of the transmission end and the reception end to conduct operations associated with the specific protocol layer.

Preferably, the environmental variable for use in the specific protocol layer may include a period for transmitting the reception status indication information in association with the reception status indication information which is periodically transmitted from the reception end to the transmission end.

Preferably, the environmental variable for use in the specific protocol layer includes a minimum or maximum size of new data generated by at least one protocol layer of the transmission end and the reception end.

Preferably, the environmental variable for use in the specific protocol layer includes a time period for transmitting a polling request message, such that the transmission end may transmit a Tx request of reception status indication information to the reception end using the polling request message.

Preferably, if the transmission end transmits the polling request message whenever it transmits a predetermined amount of data to the reception end, the environmental variable for use in the specific protocol layer includes size information corresponding to the predetermined amount of data.

Preferably, if the environmental variable is established or adjusted in the specific protocol layer, this means that the value of the environmental variable is established or adjusted according to a predetermined rule prescribed in the transmission/reception ends.

For example, if the Rx buffer selected as an operation status at the specific protocol layer is filled with the amount of data of a predetermined level or higher, a predetermined period, during which the reception data status indication information selected as the environmental variable is transmitted to the transmission end, may be reduced. If the Rx buffer selected as an operation status at the specific protocol layer is filled with the amount of data of a predetermined level or less, a predetermined period, during which the reception data status indication information selected as the environmental variable is transmitted to the transmission end, may be increased.

Preferably, the predetermined level of the amount of data stored in the Rx buffer may indicate a specific case in which a predetermined number of data units are stored in the Rx buffer of the specific protocol layer.

Preferably, the predetermined level of the amount of data stored in the Rx buffer may indicate a specific case in which the sum of sizes of data blocks stored in the Rx buffer of the specific protocol layer is equal to or higher than a predetermined size.

Preferably, the specific protocol layer includes an RLC layer, a MAC layer, a PDCP layer, an RRC layer, and a physical layer.

In another aspect of the present invention, there is provided a method for allowing a specific protocol layer of a transmission end of a mobile communication system to retransmit at least one data block comprising: receiving first reception status indication information associated with at least one data block transmitted to a reception end from the reception end; and retransmitting the at least one data block according to the first reception status indication information in consideration of second reception status indication information received from the reception end.

It is to be understood that both the foregoing general description and the following detailed description of the present invention are exemplary and explanatory and are intended to provide further explanation of the invention as claimed.

ADVANTAGEOUS EFFECTS

The present invention has the following effects.

Firstly, the present invention reduces unnecessary data transmission of a mobile communication system, such that data of high Tx efficiency can be transmitted.

Secondly, the present invention can more quickly and efficiently retransmit data in a specific protocol layer of a mobile communication system for retransmission.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Reference will now be made in detail to the preferred embodiments of the present invention, examples of which are illustrated in the accompanying drawings. Wherever possible, the same reference numbers will be used throughout the drawings to refer to the same or like parts.

Prior to describing the present invention, it should be noted that most terms disclosed in the present invention correspond to general terms well known in the art, but some terms have been selected by the applicant as necessary and will hereinafter be disclosed in the following description of the present invention. Therefore, it is preferable that the terms defined by the applicant be understood on the basis of their meanings in the present invention.

The following embodiments will disclose a variety of application examples of the present invention, which is applied to the IEEE 802.16e system and the IEEE 802.16m system which serve as the standard specification of not only a single-carrier multiple access system but also a multi-carrier multiple access system (e.g., an OFDM mobile communication system) considering the mobile station (MS) mobility [See IEEE Std 802.16e-2005 and http://www.ieee802.org/16/published.html]. Also, the present invention can also be applied to another mobile communication system such as an Evolved Universal Mobile Telecommunications System (E-UMTS) (also called a Long Term Evolution (LTE)). The present invention may be applied to a variety of communication systems including a single-antenna or multi-antenna system.

Generally, a communication system has been widely used to provide a variety of communication services (e.g., VoIP or packet data). The above-mentioned communication system has been used for a downlink or an uplink. The downlink is indicative of a communication from an eNode-B to a user equipment (UE). The uplink is indicative of a communication from the UE to the eNode-B. The eNode-B is indicative of a fixed point communicating with the UE, and includes a network other than the UE in a communication system including not only a physical transmission end but also an upper layer. The network and the eNode-B are symmetrical to the user equipment (UE), and it should be noted that the network has the same meaning as the eNode-B. The user equipment (UE) may be fixed or have mobility.

Figure 4:
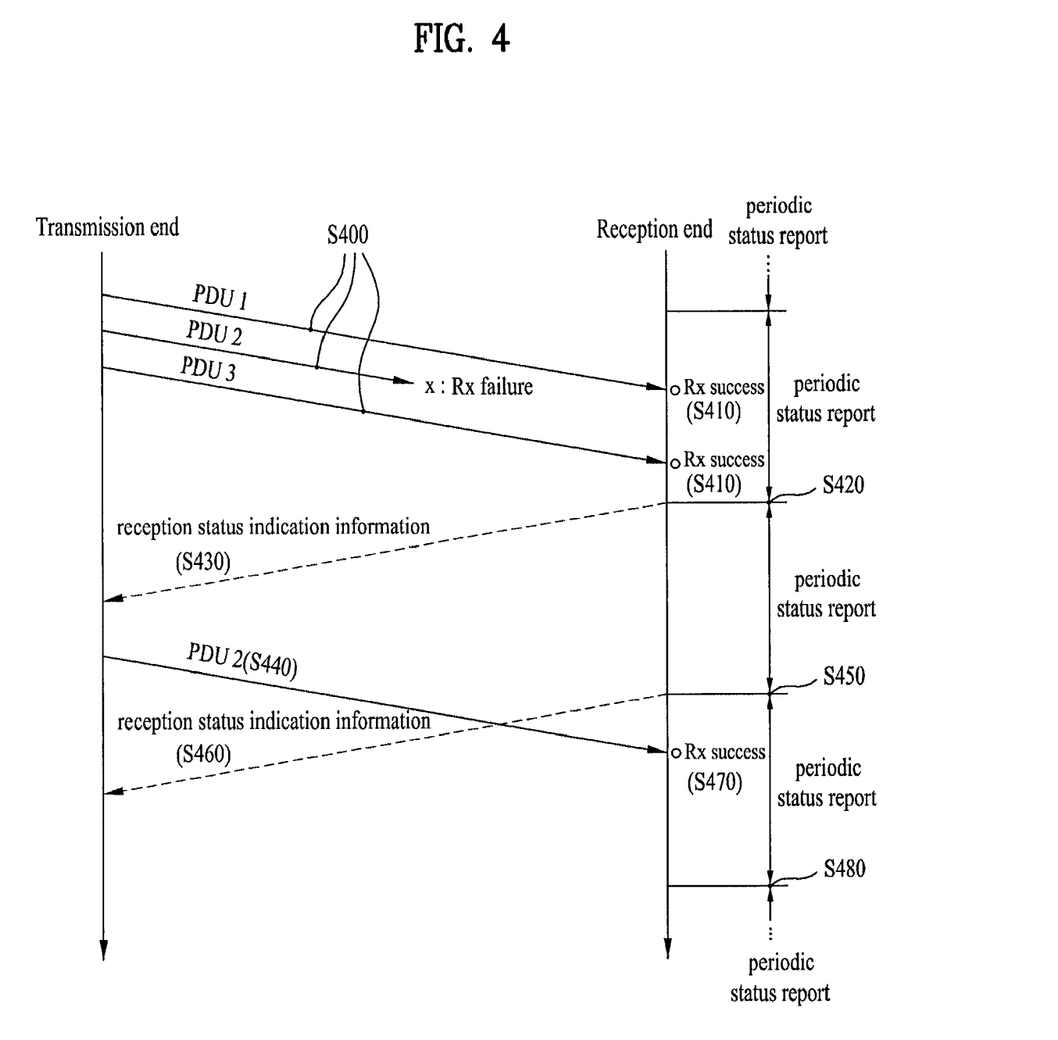
FIG. 4 is a flow chart illustrating a data transmission method in a specific protocol layer of a reception end according to one embodiment of the present invention.

FIG. 4 is a flow chart illustrating a data transmission method in a specific protocol layer of a reception end according to one embodiment of the present invention.

Referring to FIG. 4, the AM RLC entity of the transmission end transmits a data block corresponding to the AM RLC PDU to the AM RLC entity of the reception end. If the reception end recognizes the presence of AM RLC PDU which has not been received via sequence number information contained in the AM RLC PDU acting as the received data block, the transmission end transmits this status report polling request. If the reception end receives this status report polling request, or if the periodic status report time prescribed in the reception end has expired, the reception status indication information for indicating whether the data block (e.g., AM RLC PDU) has been received in the reception end without any errors is transmitted to the transmission end. Specific information indicating which one of methods will be used can be shared between the transmission end and the reception end via the system information. There is no need for the data transmission method of the present invention to be fixed at only one method. The data transmission method of the present invention may be decided by a request of the transmission end or the reception end according to a channel environment or radio-resource situation. Otherwise, at least two schemes may be used at the same time as necessary.

The above-mentioned embodiment of FIG. 4 describes a method for transmitting reception status indication information according to the periodic status report scheme. However, if a current time periodically reaches a status report time although the periodic status report method is used, the present invention determines whether to transmit the reception status indication information in consideration of an operation status of a specific protocol layer of the reception end, instead of unconditionally transmitting the reception status indication information to the transmission end. In the following embodiments including the embodiment of FIG. 4, a specific protocol layer is indicative of the RLC layer, but it may also be applied to other protocol layers, each of which requires a retransmission function.

In the embodiment of FIG. 4, an operation status of a specific protocol layer indicates whether the reception (Rx) buffer of a specific protocol layer has a standby data block which has not been transmitted to an upper layer.

If there is no standby data block in the Rx buffer of the reception end, this means that all the data blocks contained in the Rx buffer have been normally transmitted to the upper layer or the Rx buffer received no data block. In this case, there is no need for the transmission end to retransmit to the reception end, such that the transmission end need not receive the reception status indication information from the reception end.

In this way, if the status indication information transmission scheme has been prescribed as the periodic status report scheme in the reception end, and the reception buffer of the reception end has the standby data block not transmitted to the upper layer when the reception end transmits the status indication information, the reception end transmits the status indication information. In other words, the reception end transmits the status indication information only when there is a data block requiring the retransmission. Otherwise, if the Rx buffer has no standby data block transmitted to the upper layer at a transmission time of the status indication information, the status indication information is not transmitted.

In the embodiment of FIG. 4, the AM RLC entity (hereinafter referred to as a transmission end) of the transmission end transmits PDU1, PDU2, and PDU3 of the AM RLC layer such that data is transmitted to the AM RLC entity (hereinafter referred to as a reception end) of the reception end at step S400. However, only PDU1 and PDU3 are received in the reception end at step S410. In this case, if the periodic status report timer of the reception end has expired at step S420, the reception end informs the transmission end of non-received PDU2 using the reception status indication information at step S430. The transmission end retransmits 'PDU2' on the basis of the reception status indication information received from the reception end at step S440. However, if a current time reaches an expiration time of the periodic status report timer at step S450 before the AM RLC PDU2 retransmitted from the transmission end reaches the reception end, the Rx buffer has a data block not transmitted to the upper layer, such that the reception end retransmits the reception status indication information to the transmission end at step S460. Thereafter, the reception end receives the retransmitted PDU2 without any error at step S470, and transmits the AM RLC PDU to the upper layer, such that the Rx buffer has no data block to be transmitted to the upper layer. Therefore, although a current time reaches again the expiration time of the periodic status report timer at step S480, the reception status indication information is not transmitted to the transmission end.

Figure 5:
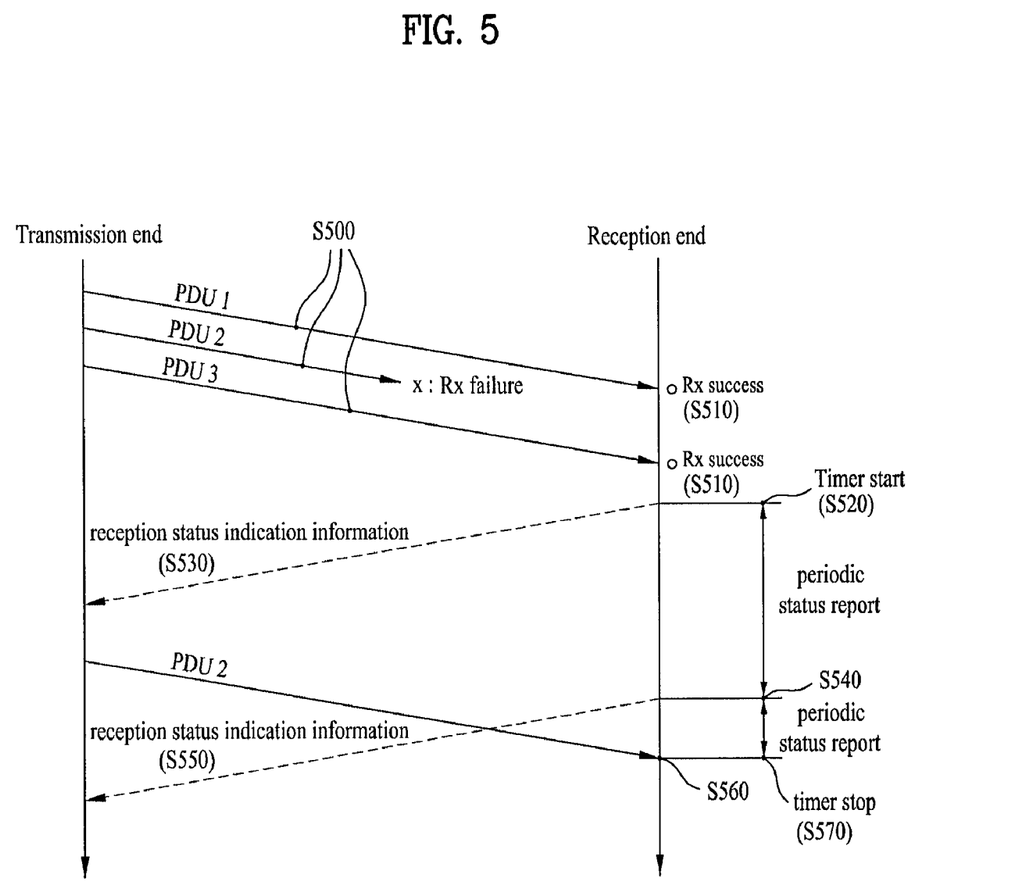
FIG. 5 is a flow chart illustrating a data transmission method in a specific protocol layer of a reception end according to another embodiment of the present invention.

FIG. 5 is a flow chart illustrating a data transmission method in a specific protocol layer of a reception end according to another embodiment of the present invention. The embodiment of FIG. 5 relates to a method for transmitting reception status indication information according to the periodic status report scheme using a timer. However, although the periodic status report method is used, if the timer indicating the period has expired, the present invention does not transmit the reception status indication information to the transmission end, but determines whether to transmit the reception status indication information in consideration of an operation status of a specific protocol layer of the reception end.

In the embodiment of FIG. 5, an operation status of a specific protocol layer indicates whether the reception (Rx) buffer of a specific protocol layer has a standby data block which has not been transmitted to an upper layer.

If there is no standby data block in the Rx buffer of the reception end, this means that all the data blocks contained in the Rx buffer have been normally transmitted to the upper layer or the Rx buffer received no data block. In this case, there is no need for the transmission end to retransmit to the reception end, such that the transmission end need not receive the reception status indication information from the reception end. In the embodiment of FIG. 5, provided that the status indication information transmission scheme is established as the periodic status report scheme in the reception end, the Rx buffer has no standby data block transmitted to the upper layer, and a current status is switched to another status including the standby data block not transmitted to the upper layer, the reception end establishes/operates the timer for the periodic status report, and at the same time transmits the reception status indication information.

Thereafter, if the timer for the periodic status report has expired, the reception end transmits the reception status indication information including the status information of the Rx buffer to the transmission end, and resets/operates the periodic status report timer. Under the condition that the periodic status report timer is being operated, if the Rx buffer has no standby data block transmitted to the upper layer, the periodic status report timer stops its operation.

In the embodiment of FIG. 5, the AM RLC entity (hereinafter referred to as a transmission end) of the transmission end transmits PDU1, PDU2, and PDU3 of the AM RLC layer, such that data is transmitted to the AM RLC entity (hereinafter referred to as a reception end) of the reception end at step S500. However, only PDU1 and PDU3 are received in the reception end at step S510. From the viewpoint of the reception end, data not received in the reception end occurs or standby data occurs, such that the periodic status report timer is established and operated at step S520, and the reception status indication information is transmitted to the transmission end at step S530. Thereafter, since the periodic status report timer has expired before the reception end again receives 'PDU2' from the transmission end at step S540, the reception status indication is re-transmitted at step S550. Thereafter, the above-mentioned PDU2 retransmitted from the transmission end arrives at the reception end at step S560, and the reception end transmits all the AM RLC PDUs contained in the Rx buffer to the upper layer. In this case, since the Rx buffer has no data blocks, the periodic status report timer stops its operation at step S570.

Figure 6:
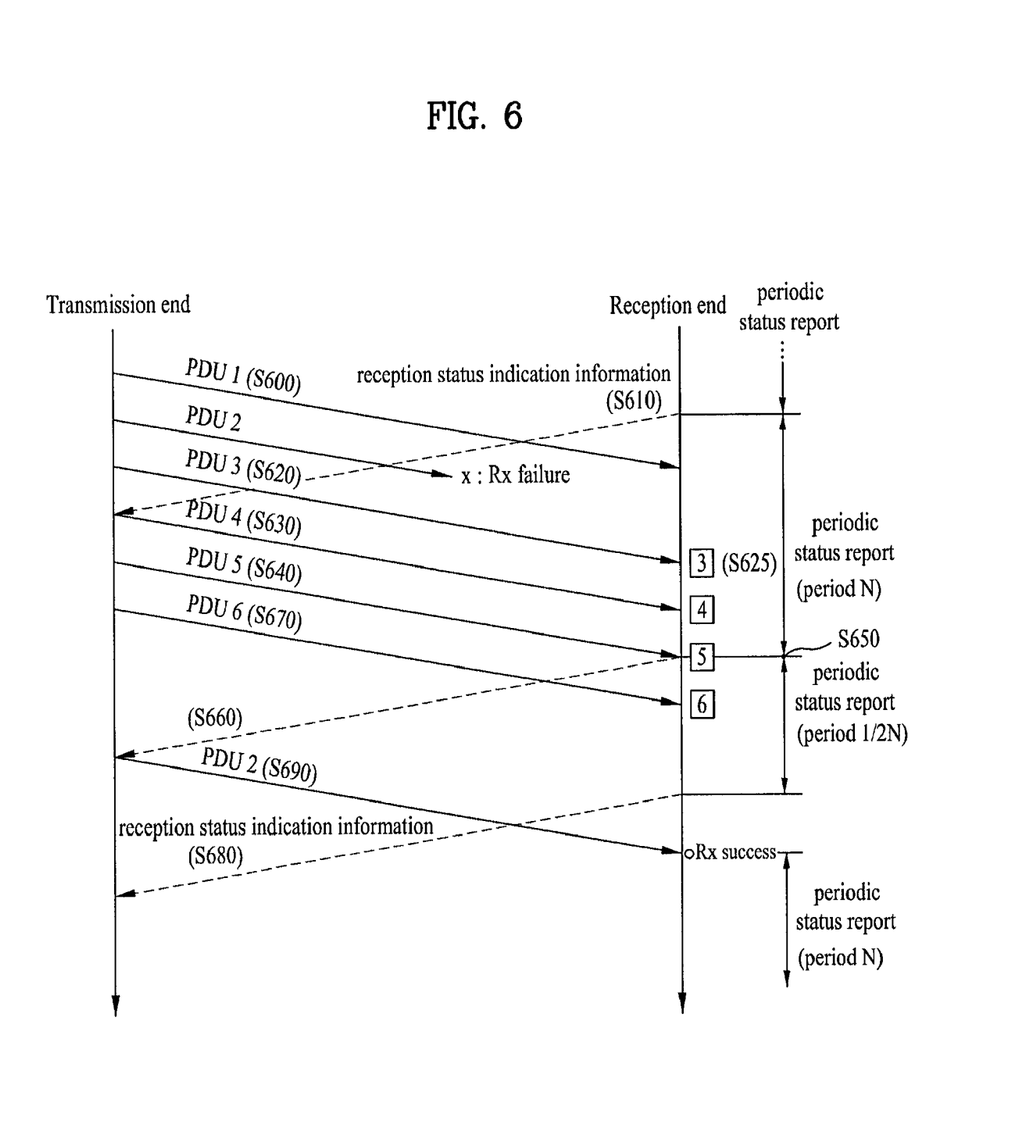
FIG. 6 is a flow chart illustrating a data transmission method in a specific protocol layer of a reception end according to still another embodiment of the present invention.

FIG. 6 is a flow chart illustrating a data transmission method in a specific protocol layer of a reception end according to still another embodiment of the present invention. The embodiment of FIG. 6 relates to a method for transmitting reception status indication information according to a variable periodic status report scheme at the AM RLC protocol layer. In the embodiment of FIG. 6, an operation status of the RLC protocol layer is indicative of an amount of data blocks stored in the RLC reception buffer, and the RLC environmental variable is a time period during which the Rx status indication information is transmitted. If the sum of data blocks in the RLC reception buffer is equal to or higher than a predetermined value, the present invention reduces a value of the time period, during which the reception status indication information acting as the RLC environmental variable is transmitted, by a predetermined unit (i.e., ½ of FIG. 6). Thereafter, if the Rx buffer has no data blocks to be transmitted to the upper layer, the present invention changes a period value of the variable periodic status report scheme to the initial setup time period.

As shown in the embodiment of FIG. 6, the reception end is operated according to the periodic status report scheme having the period of N. The transmission end transmits the data block 'PDU1' of the AM RLC layer to the reception end at step S600. Before the above-mentioned AM RLC PDU1 arrives at the reception end, the reception end uses the periodic status report scheme, such that it transmits reception status indication information having no retransmission request information to the transmission end having the original period of N at step S610.

This PDU1 is received in the RLC layer of the reception end, and is then transmitted to the upper layer. Otherwise, a variety of predetermined-unit PDUs are collected, and the collected PDUs are transmitted to the upper layer. In the embodiment of FIG. 6, if the above-mentioned PDUs are received in the order of a sequence number, the received PDUs are immediately transmitted to the upper layer.

Thereafter, the PDU3 arrives at the reception end at step S620. The reception end recognizes that the PDU2 has been lost by referring to the sequence number contained in the PDU3. The reception end stores the PDU3 in the Rx buffer at step S625 until receiving a AM RLC PDU2 retransmitted from the transmission end. Thereafter, PDU4 is received in the reception end at step S630, and AM RLC PDU5 arrives at the reception end at step S640, such the PDU4 and the AM RLC PDU5 are stored in the RLC Rx buffer and the periodic status report timer having the period N has expired at step S650. As a result, the reception end transmits the reception status indication information for requesting the retransmission of the PDU2 to the transmission end at step S660. In this case, the sum of data blocks stored in the reception-end RLC Rx buffer is equal to or higher than a predetermined value, the period for the retransmission request is changed to a predetermined-unit period. The embodiment of FIG. 6 assumes that the sum of data blocks of three PDUs stored in the RLC Rx buffer is higher than a predetermined value. In the embodiment of FIG. 6, the periodic status report period is reduced by ½.

Thereafter, the PDU6 arrives at the RLC Rx buffer of the reception end at step S670. Since the PDU2 does not arrive at the reception end within the above-mentioned reduced time period, the reception end transmits reception status indication information including retransmission request information to the transmission end at step S680. Thereafter, the PDU2 arrives at the reception end at step S690. In this case, the reception end recovers the periodic status report period from an execution time of the above step S690. Namely, the periodic status report period returns to the period of N. Thereafter, the reception end transmits all of PDU2 to PDU6 stored in the RLC Rx buffer to the upper layer.

If the period value (acting as the RLC environmental variable) of the periodic status report timer has expired, the above-mentioned timer period value is changed to a new timer value, such that the new timer value is applied to this embodiment of FIG. 6. However, if the sum of sizes of data blocks contained in the RLC Rx buffer is equal to a predetermined value, the timer period value is changed, and the periodic status report period may be decided by the changed timer period value. Otherwise, the present invention may use the new report period value after the old report period value has been used.

The present invention provides a data transmission method in a specific protocol layer of a transmission end according to still another embodiment of the present invention. The following embodiment relates to a method for retransmitting a data block at a transmission end which has received the reception status indication information transmission message based on the periodic status report scheme of the AM RLC protocol layer of the reception end. According to the following embodiments, if several reception status indication information units arrive at the transmission end at time intervals neighboring with each other, the transmission end is prevented from replying to each reception status indication information and retransmitting toward the reception end. For example, although the reception end has transmitted the reception status indication information to the transmission end at intervals of a long time, if a Hybrid Automatic Retransmission Request (HARQ) is applied to the reception end, a lower layer such as a physical layer of the transmission end reacts to ACK/NACK information transmitted from a physical layer of the reception end, such that the present invention prevents data from being frequently transmitted to the reception end.

In this embodiment, if the transmission end receives reception status indication information from the reception end, it records an arrival time of the reception status indication information. In this case, the reception status indication information may include generation time information at which the reception end generates the reception status indication information, or may include Tx start time information at which the reception end begins to transmit data to the transmission end. If the transmission end receives several reception status indication information units from the reception end within a specific time interval, the transmission end does not perform retransmission of all the retransmission-requested data blocks contained in each reception status indication information.

In order to answer at least one reception status indication information, which has been received within the specific time interval, from among retransmission-requested data blocks in the last reception status indication information which has been finally received within the specific time interval, only data blocks other than retransmitted data block by the transmission end are retransmitted, such that the present invention prevents the same data blocks from being repeatedly retransmitted. In this case, the specific time information may be shared between the transmission end and the reception end via the system information.

If the transmission end receives the reception status indication information (i.e., status information of 1) from the reception end, a timer (e.g., time period of N) corresponding to a predetermined time is established and operated. Thereafter, if the transmission end receives new reception status indication information (i.e., status information of 2) during the operation time of the timer, the transmission end compares the status information of 2 with the status information of 1, and can retransmit only the new retransmission-requested data other than the retransmitted data requested by the status information of 1. Thereafter, if the timer has expired, the timer is driven again, and at the same time the transmission end may perform retransmission of data. Otherwise, the timer is not driven, and at the same time all the retransmission-requested data blocks by each Rx status indication information may be retransmitted.

Differently from the above-mentioned embodiment, the present invention acquires the later reception status indication information using time information contained in the reception status indication information, instead of an arrival time at which the reception status indication information arrives at the transmission end, and decides whether to retransmit data using the above later reception status indication information.

In other words, the present invention ignores first reception status indication information which has been firstly generated from the reception end and was then applied to the transmission end, and may decide whether to retransmit data to the reception end using second reception status indication information caused by the loss of a multi-path or multi-channel. The second reception status indication information was generated at a later time, but it arrives at the transmission end at an earlier time.

The transmission end collects all of several reception status indication information units received within a specific time interval, rearranges the collected information units on the basis of the time information, and may perform data retransmission using the latest information. Otherwise, whenever the sum of sizes of data blocks transmitted from the transmission end to the reception end reaches a predetermined value, the present invention may rearrange several reception status indication information units received from the reception end.

For the convenience of description and better understanding of the present invention, the above-mentioned embodiments have mainly disclosed a communication execution process between the transmission end and the reception end, but it should be noted that the transmission end may be a user equipment (UE) or eNode-B of the network, and the reception end may be an eNode-B or UE of the network.

If required, individual constituent components or characteristics may be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary.

The above-mentioned embodiments of the present invention have been disclosed on the basis of a data communication relationship between the eNode-B and the user equipment (UE). In this case, the Node-B is used as a terminal node of a network via which the Node-B can directly communicate with the user equipment (UE).

For example, the user equipment (UE) may be replaced with a mobile station (MS), a mobile subscriber station (MSS), or a communication terminal as necessary. The term "eNode-B" may also be replaced with a fixed station, Node-B (NB), or eNB as necessary.

If operations or functions of the present invention are implemented by firmware or software, the present invention can be implemented in the form of a variety of formats, for example, modules, procedures, and functions, etc. The software codes may be stored in a memory unit so that it can be driven by a process. The memory unit is located inside or outside of the processor, so that it can communicate with the aforementioned processor via a variety of well-known parts.

It should be noted that most terminology disclosed in the present invention is defined in consideration of functions of the present invention, and can be differently determined according to intention of those skilled in the art or usual practices. Therefore, it is preferable that the above-mentioned terminology be understood on the basis of all contents disclosed in the present invention.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

[Industrial Applicability]

As apparent from the above description, the present invention can be applied to a communication system, for example, a data transmission method at a specific protocol layer of a mobile communication system.

The invention claimed is:

1. A method of transmitting reception status indication information at an acknowledged mode radio link control (AM RLC) entity of a reception end in a mobile communication system, the method comprising:

receiving at least one data block from a transmission end; and transmitting reception status indication information to the transmission end according to a periodic status reporting scheme, wherein if the AM RLC entity has at least one data block to be delivered to an upper layer at a time at which the transmission of the reception status indication information is needed, the transmission of the reception status indication information is carried out at the time, and wherein if the AM RLC entity has no data block to be delivered to the upper layer at the time at which the transmission of the reception status indication information is needed, the transmission of the reception status indication information is dropped at the time.

2. The method of claim 1, wherein a transmission period according to the periodic status reporting scheme is changed in consideration of reception buffer status in the AM RLC entity.

3. The method of claim 2, wherein the transmission period is reduced when sum of data blocks in a reception buffer in the AM RLC entity is equal to or higher than a predetermined value.

4. The method of claim 1, wherein the reception status indication information includes time information.

5. The method of claim 4, wherein the time information is indicative of a specific time at which the reception status indication information is generated or transmitted to the transmission end.

6. The method of claim 1, wherein the reception status indication information includes identification information indicating which data block is received or not.

* * * * *